US008913200B2

(12) United States Patent
Togita

(10) Patent No.: US 8,913,200 B2
(45) Date of Patent: Dec. 16, 2014

(54) ENCODING APPARATUS, ENCODING METHOD, AND PROGRAM

(75) Inventor: Koji Togita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 544 days.

(21) Appl. No.: 13/289,636

(22) Filed: Nov. 4, 2011

(65) Prior Publication Data

US 2012/0140030 A1    Jun. 7, 2012

(30) Foreign Application Priority Data

Dec. 7, 2010  (JP) ................................. 2010-272538

(51) Int. Cl.
| | | |
|---|---|---|
| H04N 15/00 | (2006.01) | |
| H04N 13/00 | (2006.01) | |
| H04N 9/804 | (2006.01) | |
| H04N 19/162 | (2014.01) | |
| H04N 9/82 | (2006.01) | |
| H04N 19/597 | (2014.01) | |
| H04N 19/146 | (2014.01) | |

(52) U.S. Cl.
CPC ......... *H04N 9/8042* (2013.01); *H04N 13/0048* (2013.01); *H04N 19/0023* (2013.01); *H04N 9/8227* (2013.01); *H04N 13/0062* (2013.01); *H04N 19/00769* (2013.01); *H04N 19/00169* (2013.01)
USPC ............... 348/746; 348/43; 348/51; 348/239; 348/272; 375/240; 375/240.29

(58) Field of Classification Search
USPC .................................................. 348/41–161
See application file for complete search history.

(56) References Cited

U.S. PATENT DOCUMENTS

| | | | | |
|---|---|---|---|---|
| 6,304,602 | B1 * | 10/2001 | Yokoyama | ................ 375/240.08 |
| 6,516,137 | B1 * | 2/2003 | Posch et al. | ................... 386/263 |
| 6,690,724 | B1 * | 2/2004 | Kadono | ................... 375/240.01 |
| 6,940,911 | B2 * | 9/2005 | Sugiyama | ................ 375/240.26 |
| 7,415,160 | B2 * | 8/2008 | Cho et al. | ....................... 382/236 |
| 7,466,863 | B2 * | 12/2008 | Ito | .................. 382/232 |
| 7,515,197 | B2 * | 4/2009 | Suzuki | .......................... 348/345 |
| 7,574,129 | B2 | 8/2009 | Tsukuda | |
| RE41,004 | E  * | 11/2009 | Oshima | ......................... 386/263 |

(Continued)

FOREIGN PATENT DOCUMENTS

| | | |
|---|---|---|
| CN | 1909638 A | 2/2007 |
| CN | 100474900 C | 4/2009 |
| JP | 09-065372 | 3/1997 |
| JP | H09-065372 A | 3/1997 |

OTHER PUBLICATIONS

Dec. 3, 2013 Chinese Office Action that issued in Chinese Patent Application No. 201110405080.5.

*Primary Examiner* — Joseph Ustaris
*Assistant Examiner* — Talha Nawaz
(74) *Attorney, Agent, or Firm* — Cowan, Liebowitz & Latman, P.C.

(57) ABSTRACT

An encoding apparatus for inputting a first image signal and a second image signal from an input source different from an input source of the first image signal adaptively decides a first bit rate and a second bit rate which are respectively assigned to a first encoding unit for encoding the input first image signal and a second encoding unit for encoding the input second image signal on the basis of the first image signal, on the basis of photographing mode information or distortion ratios of encoding by the encoding units.

9 Claims, 9 Drawing Sheets

(56) References Cited

U.S. PATENT DOCUMENTS

| | | | |
|---|---|---|---|
| 7,724,289 B2* | 5/2010 | Kudo | 348/231.2 |
| 7,917,000 B2* | 3/2011 | Shimazaki et al. | 386/224 |
| 7,936,376 B2* | 5/2011 | Fukuhara | 348/222.1 |
| 8,155,187 B2* | 4/2012 | Isu et al. | 375/240.12 |
| 8,264,566 B2* | 9/2012 | Park et al. | 348/222.1 |
| 8,339,415 B2* | 12/2012 | Sekizawa | 345/619 |
| 8,634,458 B2* | 1/2014 | Ishii | 375/240.03 |
| 8,675,084 B2* | 3/2014 | Bolton et al. | 348/211.4 |
| 2002/0003576 A1* | 1/2002 | Konishi et al. | 348/232 |
| 2007/0031139 A1* | 2/2007 | Tsukuda | 396/265 |
| 2007/0071094 A1* | 3/2007 | Takeda et al. | 375/240.04 |
| 2008/0056359 A1* | 3/2008 | Isu et al. | 375/240.12 |
| 2008/0056360 A1* | 3/2008 | Isu et al. | 375/240.12 |
| 2008/0056385 A1* | 3/2008 | Isu et al. | 375/240.26 |
| 2009/0002507 A1* | 1/2009 | Fukuhara | 348/222.1 |
| 2009/0238263 A1* | 9/2009 | Jaggi et al. | 375/240.2 |
| 2010/0119214 A1* | 5/2010 | Shimazaki et al. | 386/109 |
| 2010/0315416 A1* | 12/2010 | Pretlove et al. | 345/419 |
| 2010/0315486 A1* | 12/2010 | Lee et al. | 348/42 |
| 2011/0007131 A1* | 1/2011 | Okada et al. | 348/42 |
| 2011/0043614 A1* | 2/2011 | Kitazato | 348/51 |
| 2011/0063422 A1* | 3/2011 | Yoo | 348/54 |
| 2011/0069153 A1* | 3/2011 | Nakane | 348/43 |
| 2011/0075734 A1* | 3/2011 | Sakazume | 375/240.12 |

\* cited by examiner

FIG. 2

| MODE | INTER-FRAME DIFFERENCE | PARALLAX DIFFERENCE |
|---|---|---|
| 201 LANDSCAPE MODE | SMALL | SMALL |
| 202 SPORTS MODE | LARGE | SMALL |
| 203 MACRO MODE | SMALL | LARGE |
| 204 LOW-LIGHT MODE | LARGE | LARGE |

FIG. 4

| MODE | BIT RATE ASSIGNMENT |
|---|---|
| 401 LANDSCAPE MODE | FIRST RATE \| SECOND RATE |
| 402 SPORTS MODE | FIRST RATE \| SECOND RATE |
| 403 MACRO MODE | FIRST RATE \| SECOND RATE |
| 404 LOW-LIGHT MODE | FIRST RATE \| SECOND RATE |

ENCODING APPARATUS, ENCODING METHOD, AND PROGRAM

BACKGROUND OF THE INVENTION

1. Field of the Invention

The present invention relates to an encoding apparatus and, more particularly, to an encoding apparatus, an encoding method, and a program for multiplexing a plurality of encoded streams.

2. Description of the Related Art

In recent years, making of products of video cameras for performing a high-definition recording by using a disk medium, a hard disk, or a memory as a storage medium has been started. It is considered that those video cameras will spread more and more in future because they are so small as to be easily carried and can record images of high image quality. In such apparatuses, in order to perform the high-definition recording, the image is stored into a recording medium as a video stream which has been compression-encoded by, for example, MPEG4 part-10: AVC (ISO/IEC 14496-10; another name, H.264). According to such a compression-encoding method, an inter-frame prediction (inter-prediction) using a correlation between images and an intra-frame prediction (intra-prediction) using a correlation within a frame are used and an arithmetic coding is also used, thereby realizing a high-efficient compression-encoding.

A video camera arranged such that left and right image signals are input to form a 3D image has also been put into practical use.

The Official Gazette of Japanese Patent Application Laid-Open No. H09-65372 discloses an apparatus for encoding and recording respective right and left images. This Official Gazette proposes such an apparatus that a code amount to be assigned when each image is encoded is adaptively set on a picture unit basis in accordance with a correlation between the right image and the left image, thereby making degrees of deterioration of encoding of the right and left images even.

In the case of encoding the right and left images like a related art mentioned above, it is an important subject to make image quality of the right image and that of the left image even. It is also important to suppress a deterioration in encoding of the right and left images as much as possible and maintain high image quality. Therefore, in order to more efficiently encode within limited bit rates, in addition to the conventional inter-frame prediction and arithmetic coding, a parallax prediction which makes it possible to predict one of the right and left images from the other is performed as a technique peculiar to a 3D image.

When the recording of the right and left images is started, if bit rates and buffer sizes are merely set and the encoding is performed, an encoding efficiency of the parallax prediction changes in accordance with a feature of the input image, so that degrees of deterioration of encoding of the right and left images differ. In the encoding apparatus in the related art, in such a case, unnaturalness as a 3D image is reduced by matching the degrees of deterioration of encoding of the right and left images with the larger one.

However, the encoding apparatus in the related art has such a problem that the set bit rates are not effectively used so that the image quality deteriorates.

In consideration of the above problems, it is an aspect of the invention to provide an encoding apparatus in which bit rates and buffer sizes regarding the encoding of right and left images are properly distributed at the start of recording, thereby preventing a deterioration in image quality and enabling the encoding to be efficiently performed.

SUMMARY OF THE INVENTION

According to an aspect of the invention, an encoding apparatus of the present invention which inputs a first image and a second image from an input source different from an input source of the first image and encodes those images, is arranged such that a first bit rate and a second bit rate which are respectively assigned to a first encoding unit configured to encode the input first image and a second encoding unit configured to encode the input second image on the basis of the first image are adaptively decided on the basis of photographing mode information or distortion ratios of encoding by the encoding units.

Further features of the present invention will become apparent from the following description of exemplary embodiments with reference to the attached drawings.

BRIEF DESCRIPTION OF THE DRAWINGS

FIG. 2 is a diagram illustrating relations among an image, an inter-frame difference, and a parallax difference regarding a photographing mode.

FIG. 4 is a diagram illustrating a relation between the bit rates and the photographing mode which are set in accordance with the first embodiment.

DESCRIPTION OF THE EMBODIMENTS

Exemplary embodiments of the present invention will now be described in detail in accordance with the accompanied drawings. The encoding apparatus of the invention is an image encoding apparatus which can be used to encode a 3D image photographed in, for example, a video camera or the like and can be controlled by a control unit for controlling the whole camera.

In this case, the encoding apparatus of the invention can be realized as hardware, software, or a combination thereof which operates under control of the control unit of the camera. The invention is not limited to the video camera but, naturally, can be applied to any apparatus so long as it has a photographing function of a 3D image corresponding to image input units 101 and 103 in FIG. 1.

First Embodiment

Figure 1:
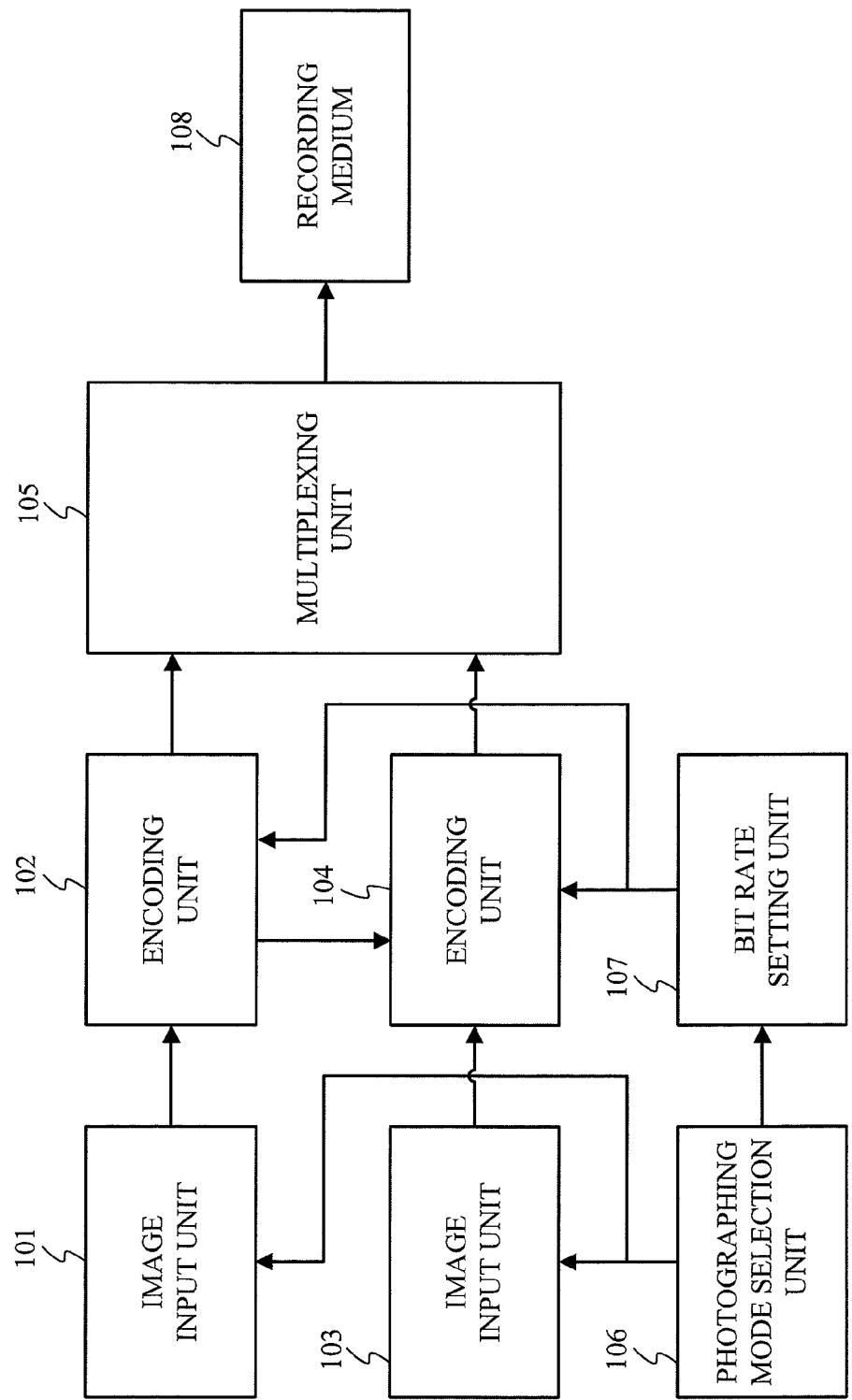
FIG. 1 is a constructional diagram of an encoding apparatus according to the first embodiment of the invention.

FIG. 1 is a constructional diagram of the encoding apparatus according to the present embodiment.

The encoding apparatus of the present embodiment has a construction in which a right image signal and a left image signal are input and the signals are respectively encoded by a plurality of different encoding units, thereby forming one multiplexed stream.

The construction and operation of the encoding apparatus of the present embodiment will be described hereinbelow with reference to FIG. 1.

Encoding Processing

The image input unit 101 inputs the image signal (first image signal) from an image pickup element for the left eye (not shown) and outputs to an encoding unit 102.

The encoding unit 102 (first encoding unit) performs an inter-frame motion prediction and a motion compensation to the input first image signal every macro block as a unit of encoding and executes an orthogonal transform and a quantization. The encoding unit 102 entropy-encodes the quantized image signal, forms an encoded stream (first encoded stream), and outputs to a multiplexing unit 105. The image input unit 103 inputs the image signal (second image signal) from an image pickup element for the right eye (not shown) and outputs to an encoding unit 104.

The encoding unit 104 (second encoding unit) performs a parallax prediction and a parallax compensation using a parallax between the right and left images, by using the image signal obtained by decoding the encoded stream formed by the encoding unit 102 to the input second image signal every macro block as a unit of encoding. Subsequently, the encoding unit 104 executes an orthogonal transform and a quantization. After that, the encoding unit 104 entropy-encodes the quantized image signal, forms an encoded stream (second encoded stream), and outputs to the multiplexing unit 105.

The multiplexing unit 105 inputs the encoded streams output from the encoding units 102 and 104, multiplexes them by the well-known format such as MPEG2-TS or MOV, and records the formed multiplexed stream onto a recording medium 108. The multiplexing unit 105 includes a random access memory (RAM) and performs the multiplexing (combining process) the encoded streams on the RAM.

A photographing mode selection unit 106 selects a desired one of a plurality of photographing modes and notifies a bit rate setting unit 107 of information showing the selected photographing mode. The photographing mode selection unit also has a function for properly setting a shutter speed, an iris, an exposure, and the like of the image pickup operation which is executed by the image pickup element, into the image input units 101 and 103 on the basis of a photographing image analogized in the selected photographing mode.

The photographing mode selection unit 106 may be an obtaining unit (photographing mode information obtaining unit) of information of the photographing mode selected by a photographing mode selection unit provided separately from the unit 106. In this case, a condition setting of the photographing which is executed by the image pickup element is performed by, for example, the control unit of the video camera in which the encoding apparatus of the present embodiment operates. In this case, the image input units 101 and 103 become units each for inputting the image signal from the image pickup element (input source of the image signal) and can be used as an encoding apparatus in an image processing apparatus such as a PC or the like without limiting to the camera or the like having an image pickup unit.

The bit rate setting unit 107 which is comprised of a processor (computer), adaptively sets a first bit rate into the encoding unit 102 and adaptively sets a second bit rate into the encoding unit 104 in accordance with the photographing mode notified from the photographing mode selection unit 106. In the invention, it is assumed that a sum of the first and second bit rates is constant (predetermined value). In the embodiment, the predetermined value has preliminarily been set to a value which does not exceed a bit rate of the multiplexed stream which is formed by the multiplexing unit 105.

That is, in the present embodiment, a distribution ratio (assignment of the bit rate to each encoding unit) of the first and second bit rates within a predetermined value is adaptively set in accordance with the photographing mode.

Photographing Mode

FIG. 2 is a table illustrating correspondence relations among the photographing mode which is notified from the photographing mode selection unit 106 to the bit rate setting unit 107 and a photographing scene, a magnitude of the inter-frame difference, and a magnitude of the parallax difference which are analogized in each photographing mode. A landscape mode 201 is a photographing mode which is used when, for example, an object at far sight such as a mountain or the like is photographed. In such a photographing scene, the inter-frame difference is small and the parallax difference between the right and left images is also small. A sports mode 202 is used when, for example, an object of a fast motion such as golf, tennis, or the like. In such a photographing scene, although the inter-frame difference is large, the parallax difference between the right and left images is small. A macro mode 203 is used when, for example, an object at near sight is photographed. In such a photographing scene, the inter-frame difference is small and the parallax difference between the right and left images is large. A low-light mode 204 is used when, for example, an object in a room where the light is reduced so that a taken picture includes noises is photographed. In such a photographing scene, the inter-frame difference is large and the parallax difference between the right and left images is also large.

Bit Rate Selection Processing

Figure 3:
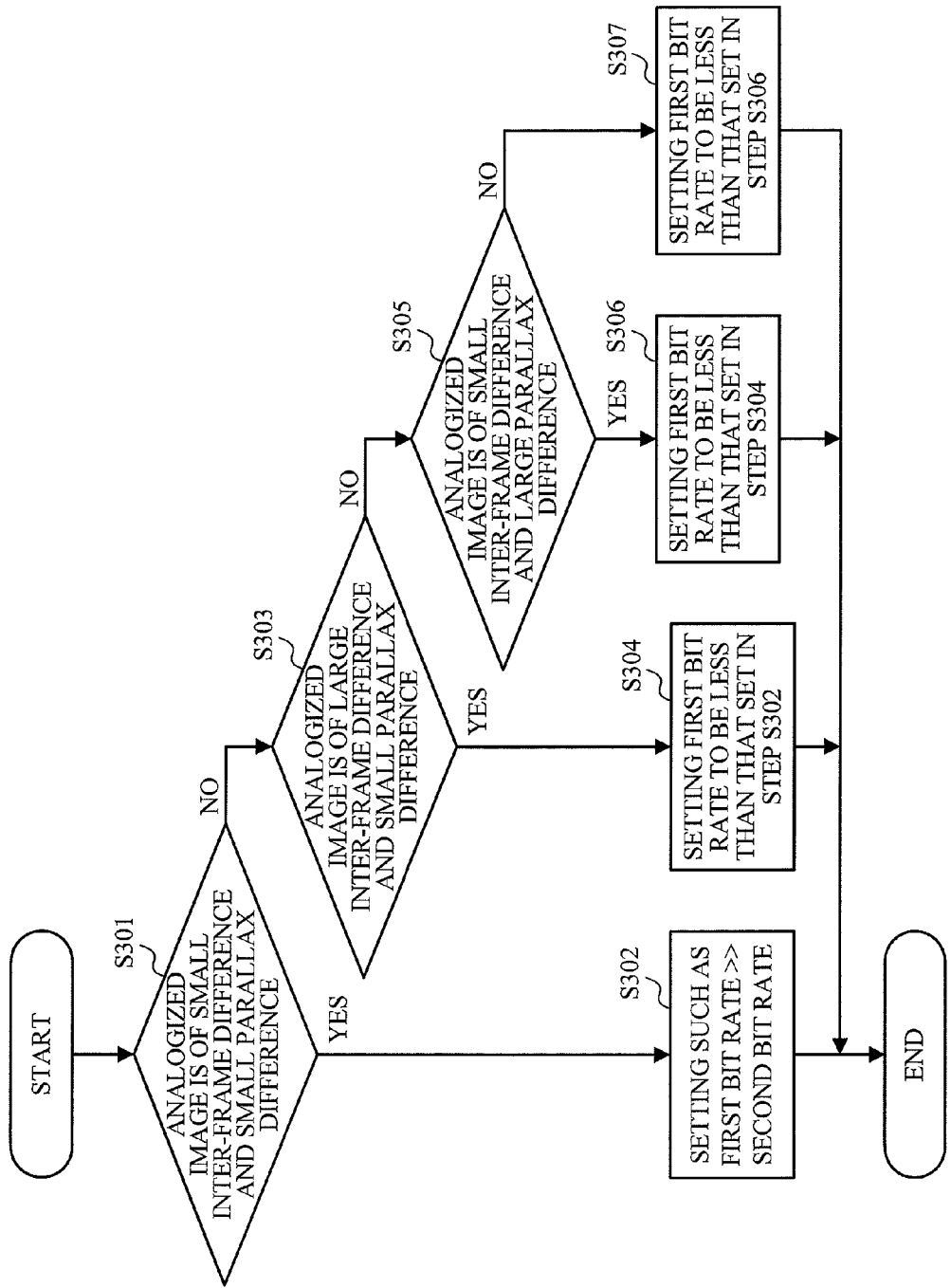
FIG. 3 is a flowchart for a bit rate setting processing which is executed in the encoding apparatus of FIG. 1.

FIG. 3 is a flowchart illustrating a processing of the bit rate setting unit 107. This processing can be attained by a method whereby a program stored in, for example, the video camera in which the encoding apparatus of the present embodiment is used is executed under control of the control unit of the camera.

A method of setting the bit rates according to the photographing mode will be described with reference to FIG. 3. In S301, whether or not a photographing scene (landscape mode) in which the inter-frame difference is small and the parallax difference is small is analogized is discriminated on the basis of the photographing mode notified from the photographing mode selection unit. If it is determined that such a photographing scene has been analogized, the processing routine advances to S302. If NO, the processing routine is branched to S303.

In S302, a distribution ratio of the values of the first and second bit rates is set under such a condition that a total value of them reaches the foregoing predetermined value so that the value of the first bit rate is larger than that of the second bit rate. In S303, whether or not a photographing scene (sports mode) in which the inter-frame difference is large and the parallax difference is small is analogized is discriminated on the basis of the notified photographing mode. If it is determined that such a photographing scene is analogized, the processing routine advances to S304. If NO, the processing routine is branched to S305.

In S304, the distribution ratio of the first and second bit rates is set so that the value of the first bit rate is smaller than the value set in S302. In S305, whether or not a photographing scene (macro mode) in which the inter-frame difference is large and the parallax difference is small is analogized is discriminated on the basis of the notified photographing mode. If it is determined that such a photographing scene is analogized, the processing routine advances to S306. If NO, the processing routine is branched to S307.

In 306, the distribution ratio of the first and second bit rates is set so that the value of the first bit rate is smaller than the value set in S304.

S307 is a setting processing in the case where a photographing scene (low-light mode) in which the inter-frame difference is large and the parallax difference is large is analogized from judgment results of S301, S303, and S305 based on the input photographing mode. In 307, the distribution ratio of the first and second bit rates is set so that the value of the first bit rate is smaller than the value set in S306. FIG. 4 is a table illustrating an example of each photographing mode and the distribution ratio of the first and second bit rates which is set by the processing illustrated in the flowchart of FIG. 3. Specific distribution values of the bit rates are not limited to the example illustrated in FIG. 4 but can be properly preset in a bit rate setting unit or the like so long as they conform with the processing illustrated in FIG. 3 mentioned above.

In a landscape mode 401, the distribution to the first bit rate is largest.

In a sports mode 402, the distribution to the first bit rate is further smaller than that in the landscape mode 401.

In a macro mode 403, the distribution to the first bit rate is further smaller than that in the sports mode 402.

In a low-light mode 404, the distribution to the first bit rate is further smaller than that in the macro mode 403.

As mentioned above, according to the present embodiment, the encoding efficiencies of the inter-prediction and the parallax prediction are analogized from the scene analogized in the photographing mode and the distribution ratio of the first and second bit rates can be properly determined. Thus, the bit rates and the buffer sizes regarding the encoding of the right and left input images can be properly distributed at the time of the recording start. Such an encoding that a difference of the encoding deterioration between the right and left images, which difference is a cause of a feeling of discomfort of the 3D image, is reduced and the deterioration in image quality can be prevented can be performed. Consequently, the encoding deterioration of the encoded streams of the right and left image signals can be made even and the 3D image having the good image quality can be obtained.

When the parallax difference is small, since the bit rate of the encoding unit 102 can be set to a value near an upper limit value (the predetermined value mentioned above), encoding precision in the encoding units 102 and 104 can be further raised. Therefore, the encoded streams can be formed as a natural 3D image, and the encoding apparatus of the 3D image suitable for the user can be provided.

Embodiment 2

Figure 5:
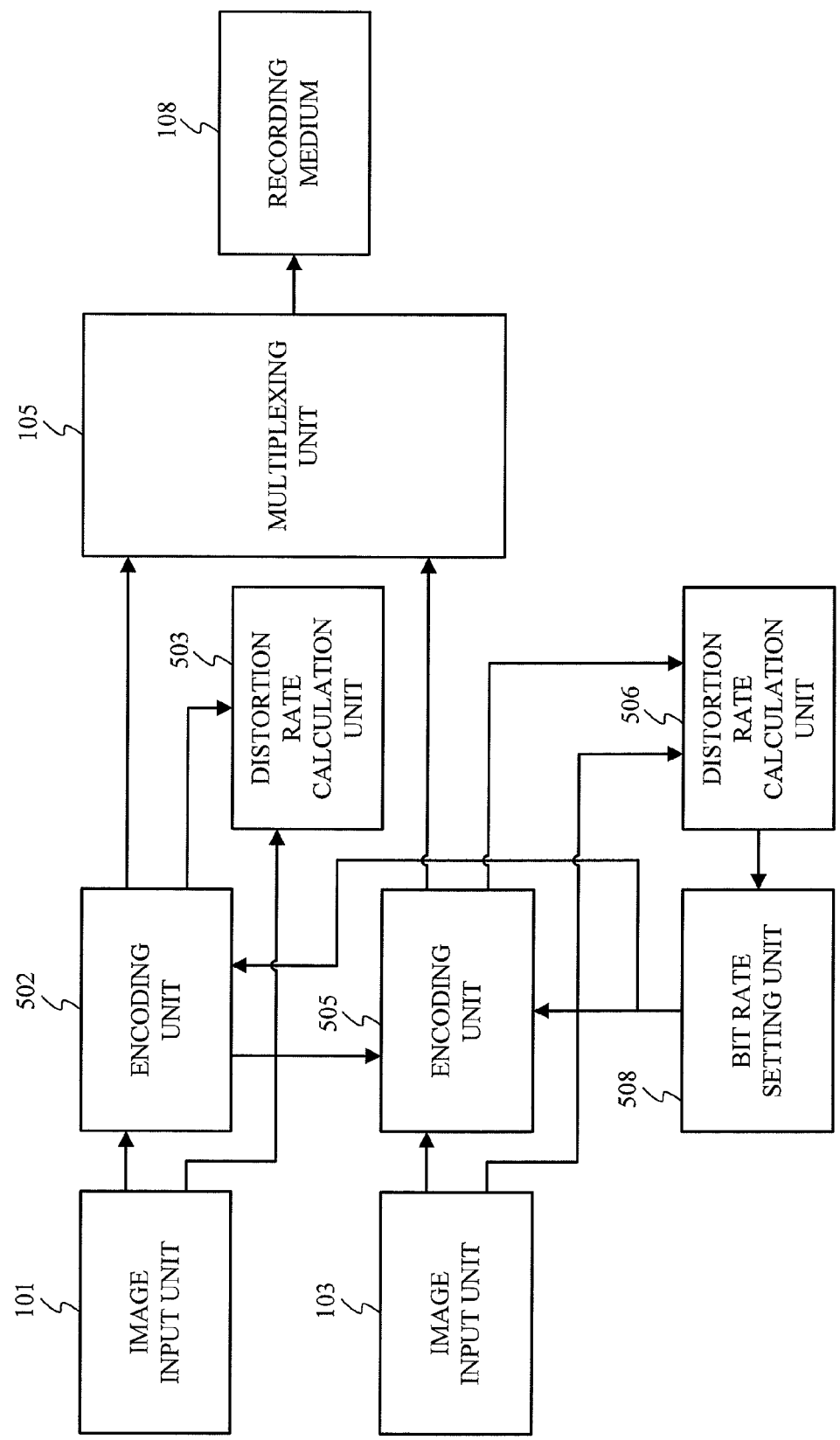
FIG. 5 is a constructional diagram of an encoding apparatus according to the second embodiment of the invention.

FIG. 5 is a constructional diagram of an encoding apparatus of the second embodiment.

In a manner similar to the first embodiment, the encoding apparatus is also an apparatus in which the left image signal and the right image signal are input, they are encoded by the plurality of different encoding units, and thereafter, one multiplexed stream is formed. The same component elements as those in the encoding apparatus of the first embodiment are denoted by the same reference numerals.

In the first embodiment, the distribution of the bit rate of each of the encoding unit for the left eye and the encoding unit for the right eye is adjusted in accordance with the selected photographing mode. However, in the second embodiment, the distribution of the bit rate is adjusted on the basis of an encoding distortion ratio of each encoding unit.

Encoding Processing

The image input units 101 and 103 are similar to those in the first embodiment.

The multiplexing unit 105 is also similar to that in the first embodiment, forms a multiplexed stream of the well-known format such as MPEG2-TS or MOV, and records onto the recording medium 108. In a manner similar to the encoding unit 102 in the first embodiment, an encoding unit 502 entropy-encodes the image signal input by the image input unit 101, forms an encoded stream, and selectively outputs its result to a distortion ratio calculation unit 503 and the multiplexing unit 105. That is, prior to the encoding (regular encoding) which starts in response to an encoding start instruction of the input image signal, the encoded stream obtained by encoding (regular encoding) the input image signal is output only to the distortion ratio calculation unit 503. On the other hand, in the regular encoding, the encoding unit 502 outputs the encoded stream to the multiplexing unit 105 and does not output to the distortion ratio calculation unit 503.

The distortion ratio calculation unit 503 calculates a first distortion ratio such as a PSNR (Peak Signal-to-Noise Ratio) by using the image signal input by the image input unit 101 and the image signal obtained by decoding the first encoded stream, and outputs the calculated first distortion ratio to a bit rate setting unit 508. The first distortion ratio is not limited to the PSNR but may be another well-known distortion ratio.

In a manner similar to the encoding unit 104 in the first embodiment, an encoding unit 505 entropy-encodes the image signal input by the image input unit 103 by a similar method, forms an encoded stream, and selectively outputs its result to a distortion ratio calculation unit 506 and the multiplexing unit 105. That is, in a manner similar to the encoding unit 502, at the time of the provisional encoding of the input image signal, the encoding unit 505 outputs the formed encoded stream only to the distortion ratio calculation unit 506. On the other hand, in the regular encoding, the encoding unit 505 outputs the encoded stream to the multiplexing unit 105 and does not output to the distortion ratio calculation unit 506.

The distortion ratio calculation unit 506 calculates a second distortion ratio such as a PSNR (Peak Signal-to-Noise Ratio) by using the image input by the image input unit 103 and the image signal obtained by decoding the second encoded stream, and outputs the calculated second distortion ratio to the bit rate setting unit 508. The second distortion ratio as well as the first distortion ratio is not limited to the PSNR but may be another well-known distortion ratio.

The bit rate setting unit 508 discriminates a magnitude of a difference between the first distortion ratio calculated in the distortion ratio calculation unit 503 and the second distortion ratio calculated in the distortion ratio calculation unit 506. If it is determined that there is no difference, the encoding start instruction is output to the encoding units 502 and 505. This discrimination can be made by, for example, a method whereby a predetermined value which is preliminarily and properly set is compared with the difference (absolute value) between the first and second distortion ratios and, when the difference is equal to or less than the predetermined value, it is determined (regarded) that there is no difference. If it is determined that the difference exists, the first bit rate is adaptively set into the encoding unit 502 and the second bit rate is adaptively set into the encoding unit 505 on the basis of the first and second distortion ratios. This setting processing is performed so that the sum of the first and second bit rates reaches a maximum assigned bit rate which can be assigned to the multiplexed stream formed by the multiplexing unit 105. That is, the bit rate setting unit adaptively distributes the maximum assigned bit rate to the first and second bit rates on the basis of the calculated distortion ratios. The maximum assigned bit rate is set to a predetermined value smaller than the bit rate of the multiplexed stream.

Bit Rate Setting Processing

Figure 6:
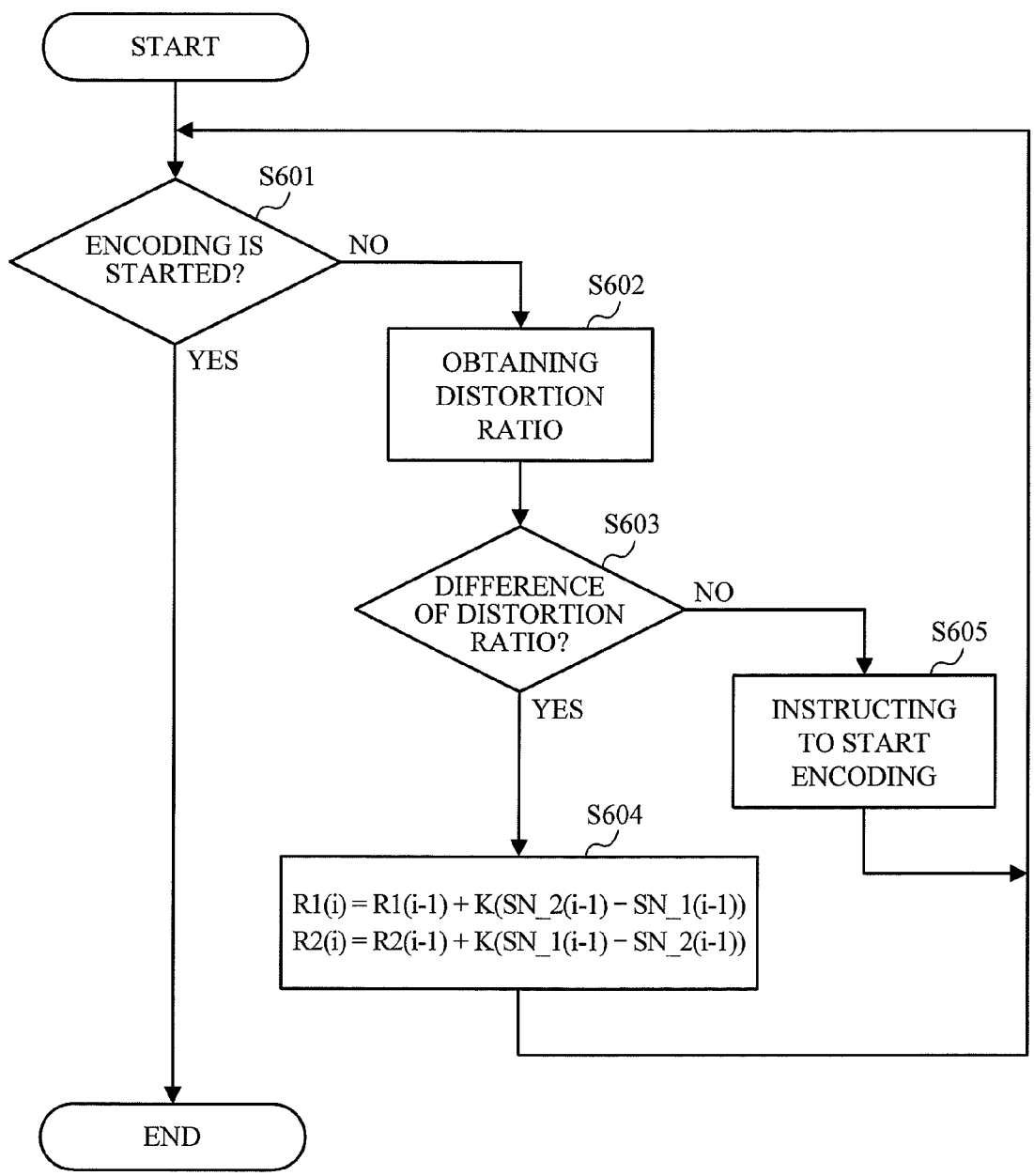
FIG. 6 is a flowchart for a bit rate setting processing which is executed in the encoding apparatus of FIG. 5.

FIG. 6 is a flowchart illustrating a processing of the bit rate setting unit 508. This processing is executed by the bit rate setting unit 508 on a picture basis to the input image signal.

A bit rate setting method in the embodiment will be described with reference to FIG. 6.

In S601, whether or not the encoding is started is discriminated.

If it is decided that the encoding is started, the processing routine is finished. If NO, the processing routine is branched to S602. "Encoding" in this case is the foregoing "regular encoding" and is started by the encoding start instruction.

In S602, the first distortion ratio calculated in the distortion ratio calculation unit 503 and the second distortion ratio calculated in the distortion ratio calculation unit 506 are obtained. The distortion ratios which are obtained at this time are values calculated with respect to the present picture of the input image signals. Therefore, the bit rates which are determined by using the obtained distortion ratios are applied to the next picture. This point will be clarified from the following equations (1). With respect to the first picture (i=1), it is assumed that bit rates R1(0) and R2(0) set as default ones are applied.

In S603, the presence or absence of the difference (absolute value) between the obtained first and second distortion ratios is discriminated as mentioned above. If the absence of the difference is decided, the encoding start instruction is formed in S605 and, thereafter, the processing routine is returned to S601. If the presence of the difference is decided, the processing routine advances to S604. In S604, the distribution ratio of the first and second bit rates is determined by using the first and second distortion ratios.

In this instance, for example, a first bit rate R1 and a second bit rate R2 are determined by using the following equations (1).

$$R1(i)=R1(i-1)+K(SN\_2(i-1)-SN\_1(i-1))$$

$$R2(i)=R2(i-1)+K(SN\_1(i-1)-SN\_2(i-1)) \quad (1)$$

Figure 7:
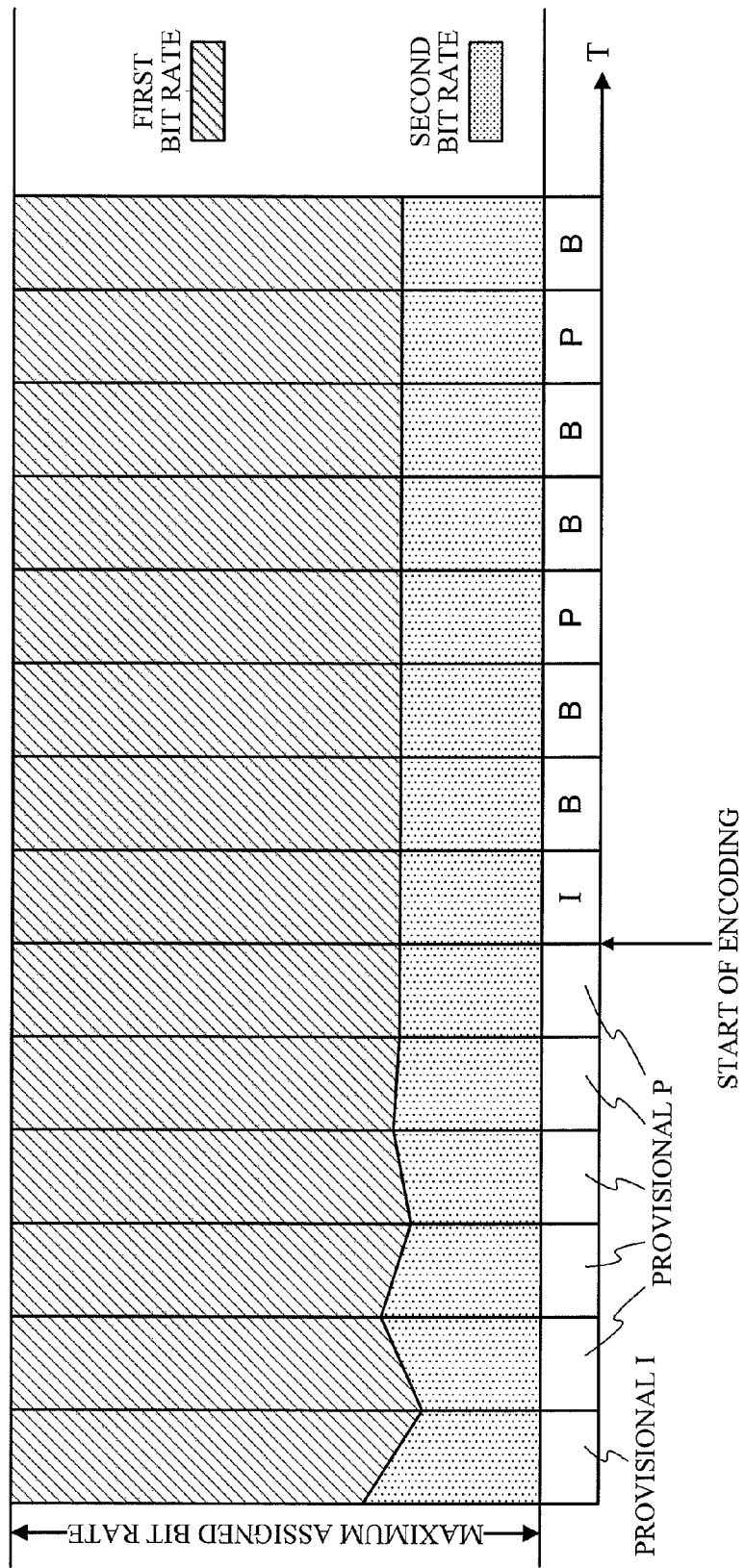
FIG. 7 is a diagram illustrating an example of setting values of the bit rates which are set by the bit rate setting processing in FIG. 6.

Where, a suffix "i" is an argument showing the number (1, 2, 3, ...) of the picture which was provisionally encoded; R1 the first bit rate; R2 the second bit rate; SN_1 the first distortion ratio; SN_2 the second distortion ratio; and K a feedback coefficient of the distortion ratio. The feedback coefficient K is a constant for converting the distortion ratio into the bit rate so that the converted bit rate may be added to the bit rate R1 or R2. While keeping the sum of the first and second bit rates constant in accordance with the above equations (1), the bit rate setting unit 508 controls the distribution of the bit rates in such a manner that the bit rate of the larger distortion ratio is reduced and, on the contrary, the bit rate of the smaller distortion ratio is raised. As will be obviously understood from the equations (1), as a result of the control, if the first distortion ratio SN_1 and the second distortion ratio SN_2 are equal, the setting value of the bit rate which is decided is equal to that of the previous picture. In the encoding apparatus of the embodiment, the foregoing processings are repeated on a picture basis and the optimum distribution of the bit rates to the first and second encoding units is decided. FIG. 7 is a diagram illustrating an example of change of the bit rate which is set at the time of encoding of each picture in accordance with the present embodiment. In the diagram, an axis of ordinate indicates the bit rate and as axis of abscissa indicates an elapsed time of the input image signal.

In the embodiment, the provisional encoding is performed to the first I picture and subsequent five P pictures in the input image signal.

The bit rate setting unit 508 performs the provisional encoding to the six pictures and accomplishes a state where the difference between the first and second distortion ratios is eliminated in the seventh picture.

By constructing the encoding apparatus as mentioned above, prior to starting the recording of the input image signal to the recording medium 108, the difference between the distortion ratios of the encoding by the encoding units 502 and 505 is compared with that at the start of the provisional encoding and can be decreased. Therefore, the encoded stream can be formed as a natural 3D image in which a deterioration in recording image quality has been suppressed, and the encoding apparatus suitable for the user can be provided.

Although the provisional encoding has been performed by using the I picture and the P pictures in the present embodiment, the provisional encoding may be performed by using the pictures including the B picture. In this case, a number (argument i) of the picture to be properly subjected to the provisional encoding is set in the bit rate setting unit 508.

Embodiment 3

Although the encoding apparatus of the present embodiment has a construction similar to that in the embodiment 2, its operation differs from that in the embodiment 2. That is, in the embodiment 3, the actual encoding (regular encoding) is started without executing the provisional encoding and, thereafter, the encoding apparatus is made operative so as to adjust the distribution of the first and second bit rates.

The operation of the encoding apparatus of the embodiment will be described hereinbelow.

The bit rate setting unit 508 adaptively sets the first bit rate into the encoding unit 502 and adaptively sets the second bit rate into the encoding unit 505 by the following method on the basis of the first distortion ratio calculated by the distortion ratio calculation unit 503 and the second distortion ratio calculated by the distortion ratio calculation unit 506.

In more detail, first, when the encoding is started, the sum of the first and second bit rates is set to a value smaller than the maximum assigned bit rate. The initial values R1(0) and R2(0) of the bit rate distribution are previously set in consideration of experience or the like. After that, while increasing the sum of the first and second bit rates so as to reach the maximum assigned bit rate, the setting of the distribution of the first and second bit rates is determined on a picture basis of the input image signal. Since other component elements are similar to those in the embodiment 2, their description is omitted here.

Figure 8:
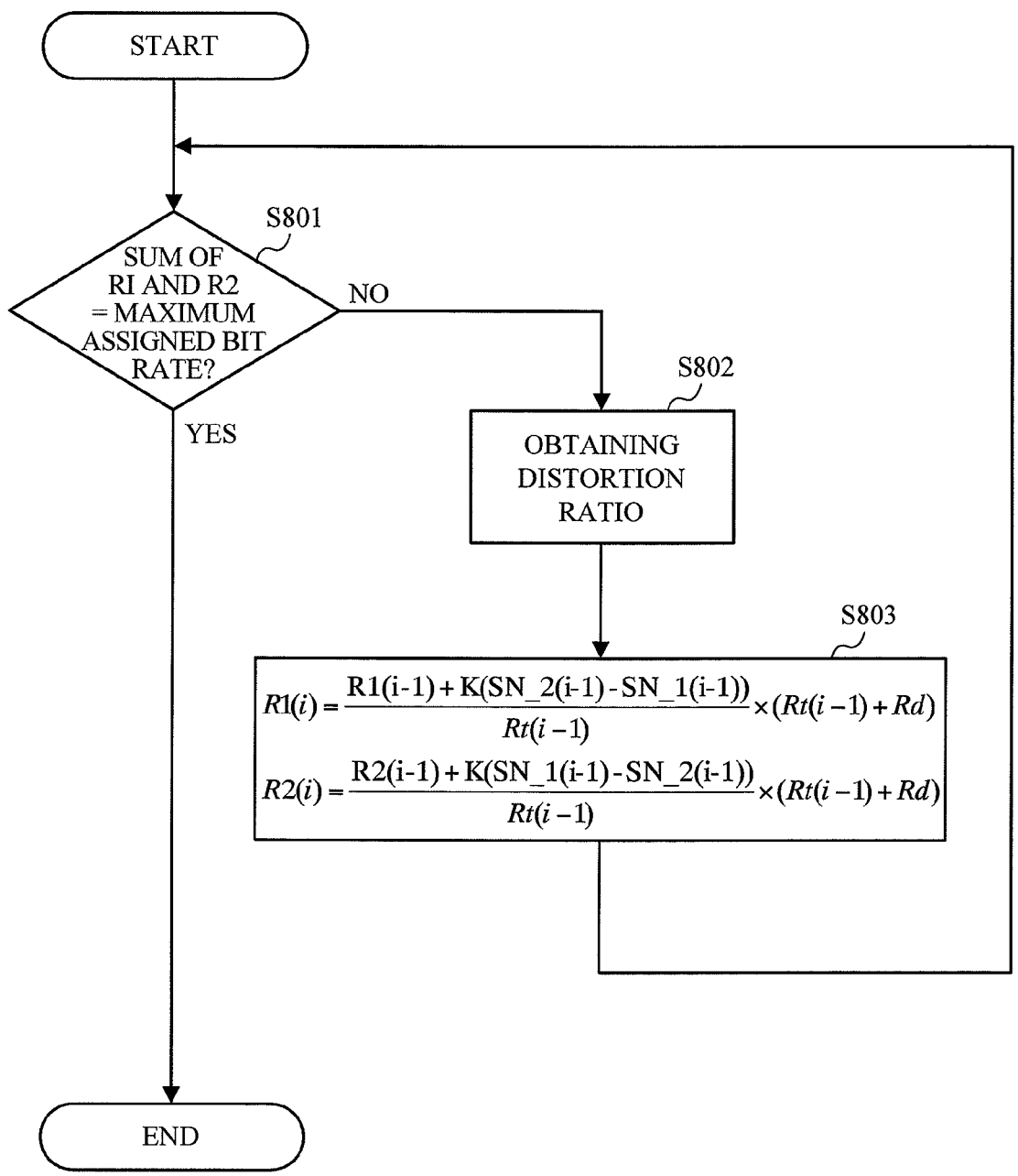
FIG. 8 is a flowchart for a bit rate setting processing in the third embodiment of the invention.

FIG. 8 is a flowchart illustrating the processing of the bit rate setting unit 508 in the embodiment 3. This processing is executed by the bit rate setting unit 508 on a picture basis to the input image signal.

The bit rate setting method of the embodiment will be described with reference to FIG. 8.

In S801, whether or not the set sum of the first bit rate R1 and the second bit rate R2 is equal to the maximum assigned bit rate is discriminated.

If it is decided that the sum is equal to the maximum assigned bit rate, the processing routine is finished. If NO, the processing routine is branched to S802.

In S802, the first distortion ratio calculated in the distortion ratio calculation unit 503 and the second distortion ratio calculated in the distortion ratio calculation unit 506 are obtained. The distortion ratios which are obtained at this time are equal to the values calculated with respect to the present picture of the input image signal. Therefore, the bit rates which are determined by using the obtained distortion ratios are applied to the next picture. This point will be obvious from the following equations (2), which will be described hereinafter.

In S803, the first bit rate and the second bit rate are determined with respect to the picture of the input image signal by using the obtained first and second distortion ratios.

In this instance, the first bit rate R1 and the second bit rate R2 are determined by using, for example, the following equations (2).

$$R1(i) = \frac{R1(i-1) + K(SN\_2(i-1) - SN\_1(i-1))}{Rt(i-1)} \times (Rt(i-1) + Rd)$$

$$R2(i) = \frac{R2(i-1) + K(SN\_1(i-1) - SN\_2(i-1))}{Rt(i-1)} \times (Rt(i-1) + Rd)$$

Where, the suffix "i" is the argument showing the number (1, 2, 3, . . . ) of the encoded picture; Rt a sum of the first and second bit rates; Rd a bit rate which is increased on a picture basis; SN_1 the first distortion ratio; SN_2 the second distortion ratio; and K the feedback coefficient of the distortion ratio. The feedback coefficient K is a constant for converting the distortion ratio into the bit rate so that the converted bit rate may be added to the bit rate R1 or R2.

As will be understood from the equations (2), the bit rate setting unit 508 controls in such a manner that while increasing the sum Rt of the first and second bit rates by a predetermined amount unit (Rd) on a picture basis, the bit rate corresponding to the smaller distortion ratio is more increased. By this control, the first and second bit rates are set so that the difference between the first and second distortion ratios is eliminated.

As a result of the control in the present embodiment mentioned above, if the set sum of the first and second bit rates reaches the maximum assigned bit rate or exceeds it, the distribution of the bit rates at that time is maintained after that.

Figure 9:
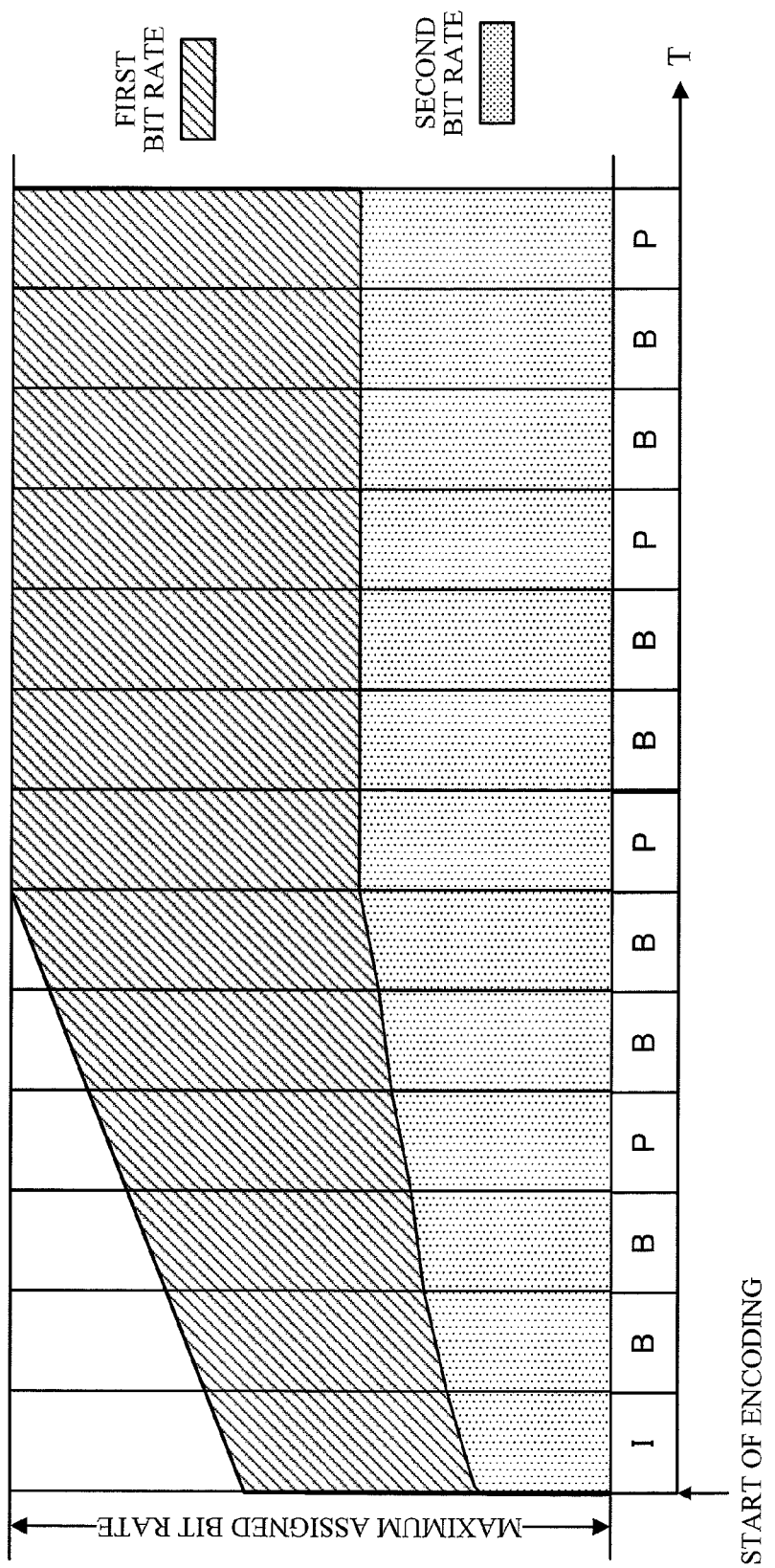
FIG. 9 is a diagram illustrating an example of the bit rates which are set by the bit rate setting processing in FIG. 8.

FIG. 9 is a diagram illustrating a change of the bit rate which is set at the time of encoding of each picture. In the diagram, an axis of ordinate indicates the bit rate and an axis of abscissa shows a temporal progress of the input image signal.

In the embodiment, after the start of encoding was instructed, as a result that the first and second bit rates are adjusted during a period of time in which the six pictures are encoded, the sum of them reaches the maximum assigned bit rate. The distribution of the bit rates adjusted by the sixth picture is applied to the seventh and subsequent pictures.

Also by the construction of the embodiment mentioned above, as compared with that at the start of encoding, the first and second bit rates can be distributed to the values to which the different encoding efficiencies are reflected so as to decrease the difference between the first and second distortion ratios. Therefore, the encoded stream can be formed as a natural 3D image in which the deterioration in recording image quality has been suppressed, and the encoding apparatus suitable for the user can be provided.

Each of the processings illustrated in FIGS. 3, 6, and 8 in the foregoing embodiments can be also realized by a method whereby a computer program for realizing the functions of the processings is read out of a memory of a system in which the encoding apparatus of the invention operates and a CPU of the system executes the program. In this case, the program stored in the memory constructs the invention.

The foregoing program may be a program for realizing a part of the foregoing functions. Further, the foregoing program may be what is called a differential file (differential program) in which the foregoing functions can be realized by a combination with the program which has already been recorded in a computer system.

All or a part of the functions of the processings illustrated in FIGS. 3, 6, and 8 may be realized by exclusive-use hardware. The processings may be executed by a method whereby the program for realizing the functions of the processings illustrated in FIGS. 3, 6, and 8 is recorded into a computer-readable recording medium and the program recorded in the recording medium is read into a computer system and executed. It is assumed that "computer system" mentioned here incorporates an OS and hardware such as peripheral devices or the like.

"Computer-readable recording medium" mentioned here incorporates a portable medium such as flexible disk, magnetooptic disk, ROM, CD-ROM, or the like, and a storage device such as a hard disk or the like built in the computer system. Further, it is assumed that such a medium also incorporates a storage device which holds the program for a predetermined time such as a volatile memory (RAM) in the computer system serving as a server or a client in the case where the program has been transmitted through a network such as Internet or the like or a communication line such as a telephone line or the like.

The foregoing program may be transmitted from the computer system in which the program has been stored in the storage device or the like to another computer system through a transmission medium or by a transmission wave in the transmission medium. "Transmission medium" for transmitting the program denotes a medium having a function for transmitting information such as network (communication network) like Internet or the like or communication line (communication wire) like a telephone line or the like.

A program product such as a computer-readable recording medium or the like in which the program has been recorded can be also applied as an embodiment of the invention. The program, recording medium, transmission medium, and program product mentioned above are incorporated in the purview of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-272538, filed on Dec. 7, 2010 which is hereby incorporated by reference herein in its entirety.

What is claimed is:

1. An encoding apparatus for inputting a first image signal and a second image signal from an input source different from an input source of the first image signal and encoding each of the image signals, comprising:

a first encoding unit configured to encode the input first image signal;

a second encoding unit configured to encode the input second image signal on the basis of the first image signal;

a multiplexing unit configured to multiplex on a memory, a first encoded stream which is output by the first encoding unit and a second encoded stream which is output by the second encoding unit;

a first distortion ratio calculation unit configured to calculate a first distortion ratio as a distortion ratio of encoding by the first encoding unit from the input first image signal and the first encoded stream; and a second distortion ratio calculation unit configured to calculate a second distortion ratio as a distortion ratio of encoding by the second encoding unit from the input second image signal and the second encoded stream; and a bit rate setting unit configured to set a first bit rate and a second bit rate which are respectively assigned to the first encoding unit and the second encoding unit, wherein the bit rate setting unit adaptively decides setting values of the first bit rate and the second bit rate on the basis of the first distortion ratio and the second distortion ratio.

2. An apparatus according to claim 1, wherein the bit rate setting unit decides distribution of the first bit rate and the second bit rate so that a sum of the setting values of the first bit rate and the second bit rate is equal to a predetermined value which is equal to or less than a maximum assigned bit rate at which the multiplexing can be performed in the multiplexing unit.

3. An apparatus according to claim 2, wherein the bit rate setting unit adaptively decides the distribution of the first bit rate and the second bit rate on a picture basis of the input image signal from a start of the input of the first and second image signals until a difference between the first distortion ratio and the second distortion ratio is eliminated.

4. An apparatus according to claim 2, wherein the first distortion ratio calculation unit and the second distortion ratio calculation unit calculate the first distortion ratio and the second distortion ratio on a picture basis of the input image signal, respectively.

5. An apparatus according to claim 1, wherein the bit rate setting unit decides distribution of the first bit rate and the second bit rate on a picture basis by decreasing the bit rate assigned to the encoding unit corresponding to the larger distortion ratio and increasing the bit rate assigned to the encoding unit corresponding to the smaller distortion ratio.

6. An apparatus according to claim 1, wherein the bit rate setting unit sets an initial value of a sum of the first bit rate and the second bit rate to a value smaller than a maximum assigned bit rate at which the multiplexing can be performed in the multiplexing unit, and after the image signal is input, the bit rate setting unit adaptively decides distribution of the first bit rate and the second bit rate on a picture basis by increasing the sum of the first bit rate and the second bit rate by a predetermined amount unit until it reaches the maximum assigned bit rate.

7. An apparatus according to claim 2, wherein the bit rate setting unit decides the distribution of the first bit rate and the second bit rate on a picture basis in accordance with the difference between the first distortion ratio and the second distortion ratio.

8. A control method of an encoding apparatus for inputting a first image signal and a second image signal from an input source different from an input source of the first image signal and encoding each of the image signals, comprising:

a first encoding step of encoding the input first image signal;

a second encoding step of encoding the input second image signal on the basis of the first image signal;

a multiplexing step of multiplexing on a memory, a first encoded stream which is output by the first encoding step and a second encoded stream which is output by the second encoding step;

a first distortion ratio calculation step of calculating a first distortion ratio as a distortion ratio of encoding in the first encoding step from the input first image signal and the first encoded stream; and a second distortion ratio calculation step of calculating a second distortion ratio as a distortion ratio of encoding in the second encoding step from the input second image signal and the second encoded stream; and a bit rate setting step of setting a first bit rate and a second bit rate which are respectively assigned to the first encoding step and the second encoding step, wherein in the bit rate setting step, setting values of the first bit rate and the second bit rate are adaptively decided on the basis of the first distortion ratio and the second distortion ratio.

9. A non-transitory computer-readable storage medium storing a program comprising a program code for causing a computer to execute a control method according to claim 8.

* * * * *